ALTERNATING ELECTRIC POWER GENERATOR

Original Filed Nov. 14, 1961 2 Sheets-Sheet 1

INVENTOR.
EDWIN LANGBERG
BY Kenway, Jenney & Hildreth
ATTORNEYS

ALTERNATING ELECTRIC POWER GENERATOR

Original Filed Nov. 14, 1961

INVENTOR.
EDWIN LANGBERG
BY Kenway Jenney & Hildreth
ATTORNEYS

United States Patent Office 3,398,321
Patented Aug. 20, 1968

3,398,321
ALTERNATING ELECTRIC POWER GENERATOR

Edwin Langberg, Lexington, Mass., assignor to Avco Corporation, Cincinnati, Ohio, a corporation of Delaware Continuation of application Ser. No. 152,230, Nov. 14, 1961. This application Mar. 31, 1965, Ser. No. 445,868
17 Claims. (Cl. 315—39)

ABSTRACT OF THE DISCLOSURE

This invention relates to an alternating electric power generator and more particularly to a microwave power generator. When current flowing through certain gas mixtures is plotted as a function of the voltage applied to the mixtures there is a region in which the current decreases with increasing voltage. This region is said to be a negative differential resistance region. When a voltage is imparted through the gas mixture to bias the gas mixture within the negative differential resistance region, and when the gases so biased are coupled to a resonant circuit the combination will comprise an alternating current power generator developing electric power in the microwave region.

My invention relates to a novel device which converts direct electrical powers to alternating electrical power. More particularly it relates to a novel source of alternating electrical power at frequencies ranging from a few megacycles to several kalomegacycles.

This application is a continuation of the patent application entitled Alternating Electric Power Generator, Serial No. 152,230, filed Nov. 14, 1961.

Alternating electrical power generators of many kinds are known, the selection of a particular type being made principally on the basis of the desired frequency and cost. At frequencies up to approximately 200 megacycles, electron tube oscillators or transistor oscillators are principally used to generate alternating electrical power. If frequencies above 200 megacycles are desired, devices such as klystrons, magnetrons and variations of these basic generators have been used. Generators for these higher frequencies have also been developed utilizing tunnel diodes and similar devices. At the lower frequencies, i.e. the range below 200 megacycles, the tube and transistor oscillators provide power at satisfactory levels at a relatively low cost. However, when substantial power is desired at higher frequencies, and particularly in the microwave range, known devices become complicated and expensive. Thus, while radio frequency power generators made according to my invention are capable of generating alternating electrical signals in both the lower and higher frequency ranges, they find their principal utility in generating microwave signals. At these higher frequencies, generators made according to my invention are substantially lower in cost than the klystrons, magnetrons, etc. heretofore available and yet supply substantial amounts of power. Additionally, the radio frequency generators of my invention offer a number of practical advantages as will be hereinafter discussed.

Devices made according to my invention may be used to supply energy for the many applications for which microwave energy is useful i.e. communication systems, radar systems, navigation systems etc. Additionally because of the relatively large amounts of power which they provide, radio frequency power generators of my invention are useful as power sources for microwave heating and cooking apparatus. Microwave cooking or heating apparatus has been developed prior to my invention. However, this equipment has used conventional radio frequency power generators as microwave power sources. The cost of the microwave cooking equipment has thus been very high and it has found limited acceptance. In general it has been purchased by users only for those applications where the high speed of complete cooking it afforded was of sufficient importance to justify the relatively high cost.

It has been found that if the current flowing through certain gas mixtures is plotted as a function of the voltage applied to the mixtures, there is a region in which the current decreases with increasing voltage. That is, a portion of the current-voltage curve exhibits a negative slope. Since the slope of the voltage-current curve at any point corresponds to the differential of the resistance at that point, the region of negative slope curve is termed a region where the gas mixture exhibits a negative differential resistance.

In electrical power generators made in accordance with my invention, I provide a closed container, a glass tube at lower frequencies, or a sealed microwave cavity at higher frequencies filled with a gas which is biased to the point where it exhibits a negative differential resistance. Means may be provided for generating a plasma in the contained gas. As used in this specification and in the appended claims a plasma is defined as an ionized gas in which the number of positive ions is approximately equal to the number of electrons in the gas so that the space charge in the gas is compensated.

The pressure of the gas within the container, as well as the voltage applied to the plasma are selected so that the gas in the closed container exhibits a negative differential resistance. A resonant circuit is provided in association with the gas container which is tuned to the desired operating frequency, and the resulting sustained oscillations at the frequency of the resonant circuit are used to supply useful power to a load.

The use of devices which exhibit a negative differential resistance to provide an alternating electrical signal generator has heretofore been attempted. Thus certain tetrode vacuum tubes which exhibit negative differential resistance have been recognized as useful as alternating electrical signal generators. (See Hall, The Dynatron, A Vacuum Tube Possessing Negative Electric Resistance, I.R.E. Proc. 6 (1918), 5–35.) However, the use of vacuum tubes as negative differential resistance elements has not been very successful at higher frequencies and feedback amplifiers or special tubes such as klystrons and magnetrons have become the conventional sources of such power.

Accordingly, it is a general object of my invention to provide an improved alternating electrical power generator.

A more specific object of my invention is to provide an electrical power generator of the type described which is particularly useful at the microwave frequencies.

Another object of my invention is to provide an alternating electrical power generator of the type described which is inexpensive in construction and yet will supply substantial amounts of power at a desired frequency.

Another object of my invention is to provide an alternating electrical power generator of the type described which uses a plasma to provide a negative differential resistance.

Other and further objects of my invention will in part be obvious and will, in part, appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawing in which.

Figure 1:
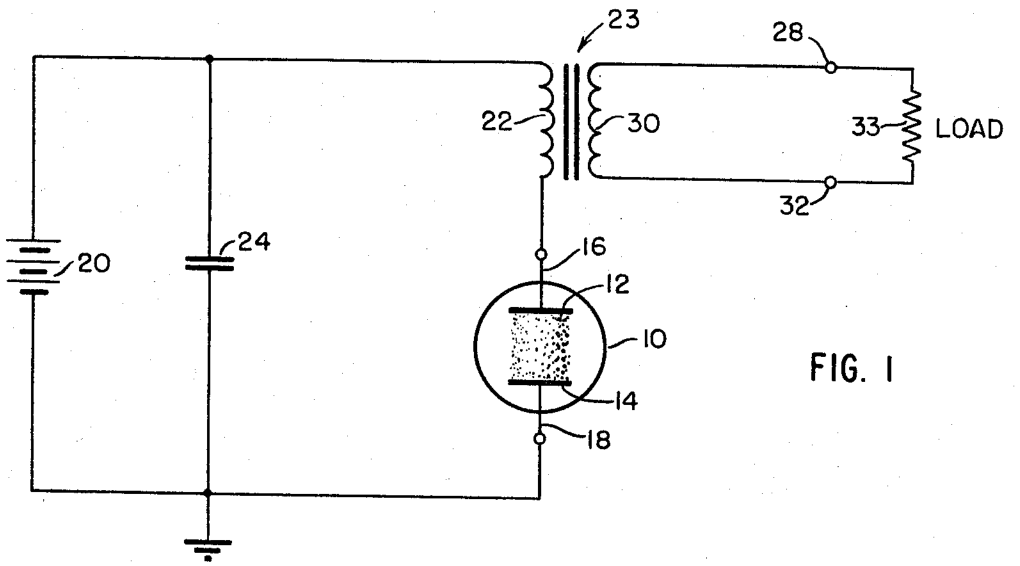
FIG. 1 is a schematic circuit diagram of a radio frequency power generator made according to my invention.

As shown in FIG. 1, the radio frequency power generator of my invention includes a sealed tube or envelope 10 which may be of glass or metal in which is contained a gas to be described in greater detail below. Electrodes 12 and 14 are provided within the envelope and are connected via wires 16 and 18, which extend through the envelope 10 to an external source of direct voltage 20 (here shown for illustration as a battery) through the primary winding 22 of the transformer 23.

A capacitor 24 is connected in parallel with the series combination of the gas cell 10 and the primary winding 22. The capacitor 24, the winding 22 and gas cell 10 form a tuned circuit, resonant at the desired frequency of operation. The alternating signal developed across winding 22 is coupled to the secondary winding 30 of the transformer 23 to which are connected the output terminals 28 and 32 of the device. A load, illustratively shown as a resistor 33, may be connected across the output terminals.

Figure 2:
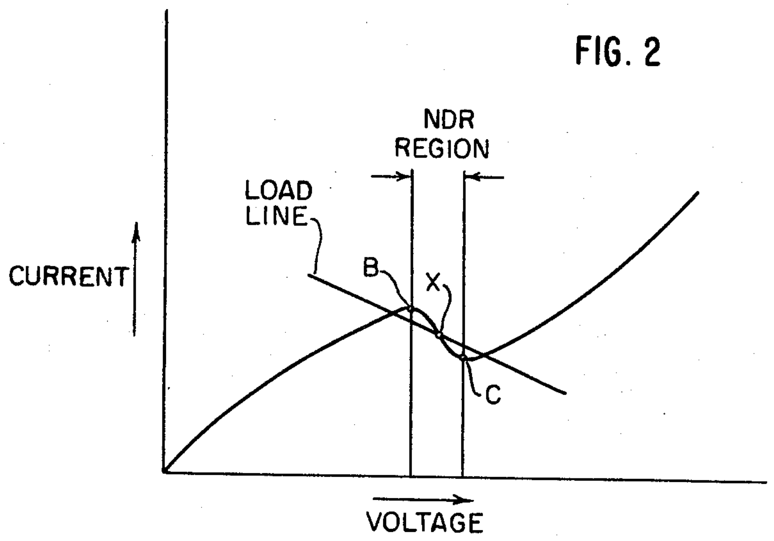
FIG. 2 is a plot of the voltage current characteristic of a typical gas which exhibits a negative differential characteristic.

In FIG. 2, I have illustrated a typical voltage-current characteristic for a gas such as that in the tube 10 which exhibits a negative differential resistance characteristic. As the voltage is increased, from zero, the current through the gas increases with increasing voltage until at the point B the rate of change of current with voltage goes to 0. Thereafter in the region from B to C the current decreases with increasing voltage. At the point C the rate of change again goes to 0, and thereafter the current again increases with increasing voltage. The region B–C is the negative differential region. The voltage at which the negative differential resistance region occurs is a function of gas pressure. To completely normalize the curve of FIG. 2, the value plotted along the horizontal axis would be voltage over pressure, rather than only the voltage.

Also plotted on the curve of FIG. 2 is a load line which is representative of the resistor 33. This load line is of course only for alternating signals as opposed to direct signals, since the transformer 23 couples in the load to the generator only for transient or alternating currents through the cell 10. The load line is established by the voltage of source 20 and the magnitude of the coupled impedance from the load. Thus, the voltage of source 20 is plotted on the curve of FIG. 2, and the point where a vertical line from this voltage intersects the voltage-current characteristic is the operating point. The voltage of source 20 should be selected so that this operating point falls in the middle of the negative differential resistance region, identified as the point X in FIG. 2. The slope of the load line is then determined by the magnitude of the reflected impedance of the load. If the load is purely resistive, which is preferable, the load line will be a single straight line as illustrated. For operation of a negative differential resistance oscillator, it is necessary that the load line, as shown in FIG. 2, interset the voltage-current characteristics of the negative differential device at more than one point. This multiple intersection leads to instabilities an oscillations. Thus, to obtain oscillations from a device, such as a plasma containing tube exhibiting negative differential resistance, it is necessary that the external load be matched to the device so that the load line intersects the voltage-current characteristic at two or more points.

In general, I have found that a pure gas i.e. a gas without any other types of gas mixed with it, does not exhibit useful regions of negative differential resistance. Only mixtures of gases exhibit this phenomenon over a sufficiently broad range of electron energies to be useful in my invention. The reason that a gas mixture under certain conditions exhibits a negative differential resistance is not completely understood. However, the following explanation is believed to be correct: Current through a gas is a measure of the number and velocity of the electrons and ions traversing the gas. Thus, in a diode vacuum tube where no gas is present and the number of electrons emitted by the hot cathode is substantially constant for a constant filament voltage, an increase in the potential across the tube increases the current flow since it increases the voltage gradient through which the electrons are falling and therefore increases their velocity.

In a gas, however, the electrons collide in their passage through the gas with gas atoms. The average distance that an electron travels between collisions is the means free path of the electron in the gas. If the electron in a pure gas gains an energy $$K=\frac{1}{2}(mv_e^2)$$

between collisions and loses this energy upon collision, the average velocity, $v_d$ of the electron in the direction of the electric field is $$v_d=\frac{1}{2}v_e$$

Since from the previous equation $$v_e=\sqrt{2K/m}$$

the average drift velocity in a pure gas is:

$$v_d=\frac{1}{2}\sqrt{2K/m}$$

K being the energy gained between collisions, $V_e$ being the electron velocity in the direction of electron travel. Thus, in a pure gas the drift velocity, and therefore the current through the gas is proportional to the square root of the energy lost for each collision. Certain gas mixtures do exhibit useful negative differential resistance regions. In these mixtures, one of two gases acts to absorb energy from the moving electrons. The other gas atoms act to scatter the electrons, but in general absorb little energy. Thus the average energy lost per collision by the electron is reduced since effectively energy is lost only by collision with an atoms of the energy absorbing gas and not by collision with atoms of the scattering gas. Since the average energy lost per collision is thus reduced, the drift velocity and therefore the current through the gas is reduced.

For a gas mixture to exhibit a negative differential resistance, the probability of collision by an electron with the atoms of the energy absorbing gas should remain constant or diminish as electron energy is increased and the probability of collision with atoms of the scattering gas should increase as electron energy is increased. If the gases have the required masses and the operating conditions are properly selected, a negative differential resistance can be obtained.

Figure 3:
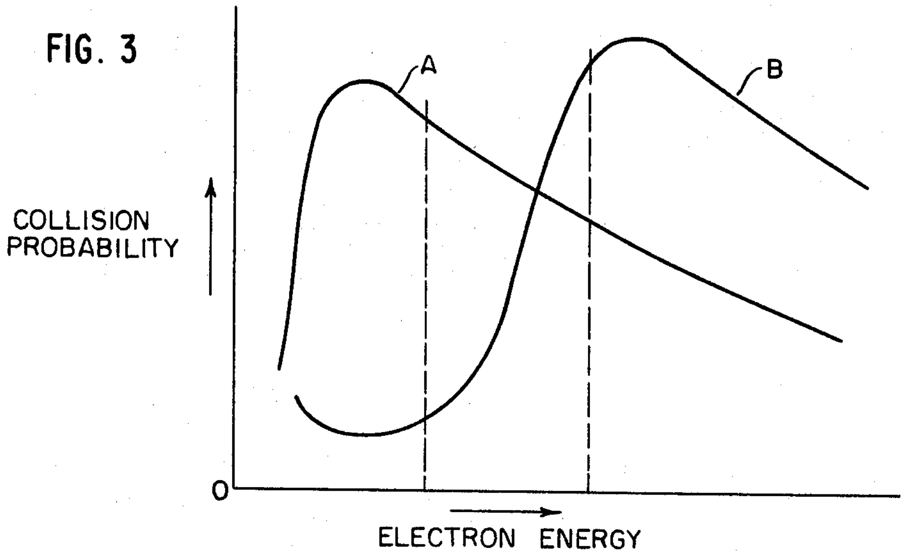
FIG. 3 is a plot of the electron collision cross section of two different gases which is helpful in explaining the negative differential resistance phenomenon in an ionized gas.

FIG. 3 is a plot of the collision cross section (which is related to the probability of collision) of an electron with atoms of two different gases A and B. It will be observed that in the band of energies between the broken lines the probability of collision with gas A diminishes with increasing electron energy while the probability of collision with gas B rises very sharply. If A is a gas having a relatively light weight, such as helium for example and B is a relatively heavy gas, such as xenon, then the two gases will exhibit the negative differential resistance phenomenon.

While certain pure gases may exhibit a region in which negative differential resistance occurs, in practice they are not useful as gases in which sustained oscillation may take place. The usable negative differential resistance region is generally confined to a very narrow band of energies. In an actual gas, the electron energies are statistically distributed over a fairly wide range and enough of them do not fall within the narrow negative differential resistance region to make pure gases practical.

Negative differential resistance regions have been observed in other gas combinations than that mentioned including mixtures such as argon-nitrogen, argon-carbon dioxide, argon-methane, xenon-carbon dioxide, xenon-methane and krypton-methane. Additionally, argon-helium, krypton-helium and cesium-helium exhibit negative differential resistance regions.

It will be apparent from the discussion above, that the phenomena of negative differential resistance takes place because of the transfer of energy from electrons, accelerated by a constant electron field, to the radio frequency field as a result of collisions between electrons and atoms. In practical electrical power generators, the space charge of the electrons must be neutralized by a substantially equal number of positive ions to be able to maintain substantial electron current; as noted previously a gaseous mixture having a substantially equal number of electrons and positive ions is termed a plasma.

Cesium gas may be used in connection with a gas mixture such as helium-xenon to provide the positive ions to neutralize the electron flow through the plasma. A small amount of cesium is mixed with the gas mixture and a heated tungsten filament is provided inside the tube. The positive ions are generated by thermal ionization of the cesium by the hot tungsten filament. Other means may also be provided to insure the presence of positive ions to neutralize the space charge.

As has been previously mentioned, to get the negative differential resistance region in a gas mixture, the pressures and other operating conditions must be established. Additionally, there is a further limitation on the negative differential resistance region. Thus further limitation comes about because of the requirement that the plasma have a stable biasing point in the negative resistance region.

If the energy dissipated by the gas decreases with an increase in applied voltage (as it may if the slope of the current-voltage curve has too great a negative slope) then the system is unstable; for an increase in voltage, the electrons in the gas will continue to gain energy until a new stable operating condition is reached. From the foregoing discussion it will be apparent that while a negative differential resistance is necessary, too large a value of negative differential resistance will result in instability. I have found that, in general, if the ratio of the negative differential resistance to the actual resistance at the operating point for curves having the general shape of FIG. 2 lies between −1 and 0, a stable condition will result.

It will be noted that in the negative differential region of the curve of FIG. 2, the curve is single valued for all voltages, although it has multiple values for current. Some gases exhibit curves having multiple voltage values in the negative differential resistance region, but single values of current. For gases exhibiting these last described characteristics, the correspondence stability ratio is that of the resistance to the negative differential resistance at the selected operating point (i.e. the inverse of the ratio for determining stability of curves of the type shown in FIG. 2). The value of the ratio for the second type of curve should also be preferably in the region between −1 and 0 for stability.

Once the gases have been selected for use in the electrical signal generator on the basis of a mixture exhibiting the proper characteristic, the pressures of the two constituents must be calculated. From the conditions specified above, i.e. the differential resistance must be negative, the plasma must be stable, one gas is to effectively scatter the electrons, while the other absorbs energy from them, a mathematical formulation can be derived for the relative gas pressures assuming elastic scattering of gases as in the helium-xenon mixture. This relationship is:

$$\frac{p_1}{p_2}=\frac{P_2}{P_1}\sqrt{\frac{M_1}{M_2}}$$

where $p_1$ is the pressure of the absorbing gas, $p_2$ is the pressure of the scattering gas, $P_2$ is the probability of collision between an electron and an atom of scattering gas at the electron energy selected for operation, $P_1$ is the probability of collision with an atom of absorbing gas at the same energy, $M_1$ is the relative mass of an atom of absorbing gas and $M_2$ is the relative mass of an atom of the scattering gas. The ratio of $P_2/P_1$ is the same as the ratio of the gas cross sections at the energy of interest and these may be obtained from published data.

Once the pressure ratio is established, the minimum required pressure can be determined from the following considerations. It is apparent that an electron must undergo a large number of collisions in traversing the gas plasma for proper operation. A maximum mean free path is chosen as 0.01 cm. for a device of practical dimensions. Since the absorbing gas determines this maximum mean free path, the minimum pressure of the absorbing gas can be calculated which will provide this mean free path and thus insure a sufficient number of collisions. From mathematical considerations, the following formula can be developed for the actual pressure of the absorbing gas to provide a mean free path no longer than 0.01 cm. for elastic collisions:

$$p_1\geq\frac{T}{2.73P_1}$$

where T is the temperature in degree Kelvin. The pressure calculated is in mm. of Hg. Once the pressure of the absorbing gas is established, the pressure of the scattering gas can be determined from the previous equation. For the minimum pressure specified, the frequency of collision is of the order of 6 to $10\times10^9$ collisions per second. Since the frequency of the alternating signal generator should be at least one order of magnitude less than the collision frequency, this means that a device operating with the minimum pressures calculated from the previous equation produces signals in the range of a few hundred megacycles. For higher frequencies higher pressures are required.

Having established the required pressures, the value of the voltage gradient, in volts/cm. across the plasma must be established. This value may be calculated from the following equation:

$$E=2\mu\sqrt{P_1P_1/P_2P_2}\sqrt{m/M_1}\,N_2\sigma 2$$

where $m$ is the mass of an electron, $N_2$ is the density of atoms of the scattering gas, $\sigma 2$ is the cross-section of the gas at the selected electron energy and $\mu$ is the selected electron energy in electron volts.

Using the foregoing equations, the values of the operating parameters for a number of gas-mixtures have been determined. These are given in the following table by way of example. These parameters are for the lowest acceptable pressures and correspond to the collision frequencies mentioned.

TABLE I

| Gas Mixture | $p_1/p_2$ | $p_1$ (mm. of Hg) | $p_2$ (mm. of Hg) | E (volts/cm.) | Collision Frequency (number/second) |
|---|---|---|---|---|---|
| Helium-cesium | 9.3 | 8.8 | 0.95 | 6.8 | $6.3\times10^9$ |
| Helium-argon | 0.14 | 5.5 | 39 | 6.6 | $7.3\times10^9$ |
| Helium-krypton | 0.44 | 6.1 | 14 | 15 | $10^{10}$ |
| Helium-xenon | 0.37 | 5.5 | 15 | 12 | $8.8\times10^9$ |

Gas mixtures such as those shown above might be inserted in the tube 10 shown in FIG. 1 under the conditions specified in Table I and would provide an electrical signal at a frequency dependent upon the frequency to which the tuned circuit formed by inductor 22 and capacitor 24 is resonant. Under operating conditions the battery 20 would provide a voltage such that the average value of the voltage across the tube 10 is sufficient to maintain the voltage gradient specified in Table I between the electrodes 12 and 14.

No specific means is shown in FIG. 1 for ionization of the gas mixture in the tube, but it is to be understood that a small amount of cesium in the mixture may be ionized by a heated filament to provide the necessary positive ions.

Figure 4:
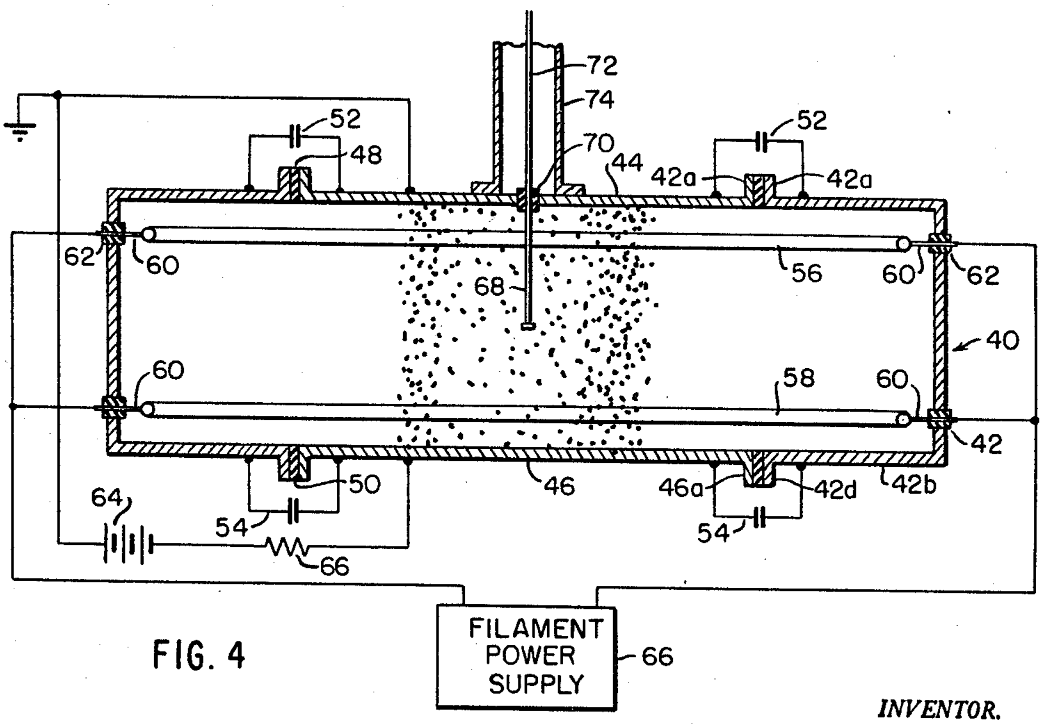
FIG. 4 is a section through a microwave power generator which is made in accordance with my invention.

At frequencies above a few hundred megacycles it is not desirable to use lumped circuit parameters such as shown in FIG. 1. An alternative design for an alternating signal generator for higher frequencies is shown in FIG. 4. In the generator of FIG. 4 the gas mixture is enclosed within a cylindrical cavity resonator 40. The cavity is formed by a cylindrical member 42 having integrally formed ends 42*a* and 42*b*. The ends only partially cover the ends of the cavity; flanges 42*c* and 42*d* are provided at the inner periphery of the ends 42*a* and 42*b* respectively. Circular disks 44 and 46 cover the opening in the top and bottom of the cavity respectively. Each of these disks are provided with flanges 44*a* and 46*a*. The disk 44 is secured as shown in the upper cavity opening by attachment of the flange 44*a* to a ring of electrically insulating material 48, which in turn is secured to the flange 42*c*. The disk 46 is similarly secured in the bottom of the cavity, the lower insulating ring being identified by the reference numeral 50. Capacitors 52 bridge the insulated joint between disk 44 and the cavity ends 42*a*, and capacitors 54 bridge the corresponding joint in the cavity bottom. Thus the entire cavity, including the disks 44 and 46, the ends 42*a* and 42*b* and the side walls form a single closed cavity for microwave energy. However, for direct voltage the disks 44 and 46 are insulated from the cavity.

An upper filament 56 in the form of a ring having a circular cross section is provided. It will be observed that this ring is positioned in the upper corners of the cavity to minimize interference with the microwave oscillation in the cavity. The upper filament causes ionization of the cesium or other alkali metal vapor to provide positive ions and is preferably made of tungsten.

The lower filament 58 is similar in construction to the filament 56 but has a lower work function. It provides electrons for the plasma. As shown, it is also located to provide minimum interference with the cavity oscillators. Both filaments are connected via supporting wires 60 which pass through insulating bushings 62 in the cavity side wall to a filament power supply 64; the filament supply, which may be either alternating or direct voltage, provides the necessary power to raise the filaments to operating temperature.

A gas mixture, similar to one of those described above is inserted in the cavity at the pressure corresponding to the frequency of operation desired. In the frequency range of a few kilomegacycles, the pressure of the absorber gas is of the order of 100 torr. Preferably a small amount of cesium is also included to provide positive ions for space charge neutralization as described above.

An electric field is provided in the central portion of the cavity by connecting the battery 64 or other source of direct voltage to the disks 44 and 46 as shown. The disk 44 which carries the output coupling device is preferably grounded as indicated. The resistor 66 in series with the battery and disk 46 provides a matched load for the oscillator, as previously discussed.

The cavity illustrated operates in the $TM_{01}$ mode, which is characterized by a constant axial electric field. By way of example for operation at 1 kilomegacycle, the internal cavity radius might be 11.3 centimeters, the cavity 6 centimeters in length and the radius of disks 44 and 46, 6 cm.

The microwave power is coupled out of the cavity by the probe 68 which is placed at the point of maximum electric field in the cavity. The probe is connected through an insulating bushing 70 to the center conductor 72 of a coaxial fitting. The outer conductor of the coaxial fitting is the tubular member 74 which is secured, as by brazing, directly to the disk 44. It is for this reason that the disk 44 is grounded.

In contrast to the circuit of FIG. 1, in FIG. 4 the gas enclosure itself forms the resonant circuit and determines the frequency of the alternating output signal.

Alternating electrical power generators made in accordance with my invention, as exemplified by those described herein, have a number of advantages over prior generators of this type. The structure as can be seen from FIGS. 1 and 4 is substantially simpler than the klystrons or magnetrons heretofore used as sources of microwave power. Thus, the devices are simpler and more economical in construction. Also, since dimensions are not critical they are much more rugged than devices previously used.

Further, alternating current power generators employing a gas plasma are low impedance devices. Thus in many applications they may be directly modulated with transistors without the requirement for impedance conversion by an expensive modulation transformer. Finally, since high voltage is not required, the expensive insulation and careful shielding characteristic of high voltage circuits to prevent flashover are not required.

Thus I have provided improved alternating signal generators, particularly adapted for use at microwave frequencies. In a preferred embodiment the generator includes an enclosure having a pair of electrodes and a gas mixture therein which exhibits a negative differential resistance. Means for providing electrons and positive ions in approximately equal quantities are also provided in the enclosure. With a steady direct voltage of appropriate value applied to the electrodes a resonant circuit tuned below the collision frequency of the electrons accelerated through the gas will be excited. At lower frequencies the resonant circuit may be one using lumped parameters. At higher frequencies, it may be a cavity. In either case, this alternating electrical signal may be coupled out of the generator for any desired use.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A negative differential resistance device comprising in combination at least a binary gas mixture having a voltage current characteristic, including a negative differential resistance region, means for imparting through said gas mixture a predetermined voltage gradient for biasing said gas mixture to said negative differential resistance region.

2. The combination defined in claim 1 in which said gas is a mixture of a light and a heavy noble gas respectively, said light noble gas being selected from the group consisting essentially of helium and neon, and said heavy noble gas being selected of the group consisting essentially of argon, krypton and xenon.

3. The combination defined in claim 1 in which said gas is a mixture of a molecular and a noble gas respectively, said molecular gas being selected from the group consisting essentially of carbon dioxide and methane, and said noble gas being selected from the group consisting essentially of argon, krypton and xenon.

4. The combination defined in claim 1 in which said gas is a mixture including helium and argon respectively.

5. The combination defined in claim 1 in which said gas is a mixture including helium and krypton.

6. The combination defined in claim 1 in which said gas is a mixture including helium and xenon.

7. The combination defined in claim 1 in which said gas is a mixture including helium and cesium.

8. A negative differential resistance device comprising in combination, a closed container, at least a tertiary gas mixture, one of said gases exhibiting a constant and decreasing probability of collision as a function of increasing electron energy, another gas exhibiting an increasing probability of collision as a function of increasing electron energy whereby a voltage current characteristic, including a negative differential resistance portion is generated, means for imparting through said gas mixture a predetermined voltage gradient for biasing said gas mixture to said negative differential resistance portion, said container having therein a first filament for supplying electrons and a second filament, said gas mixture in said container also including an alkali metal vapor as a constituent thereof, said second filament causing ionization of the atoms of said alkali metal gas to supply positive ions.

9. The combination defined in claim 8 in which said gas is a mixture of a light and a heavy noble gas respectively, said light noble gas being selected from a group consisting essentially of helium and neon, and said heavy noble gas being selected of the group consisting essentially of argon, krypton and xenon.

10. The combination defined in claim 8 in which said gas is a mixture of a molecular and a noble gas, said noble gas being selected from the group consisting essentially of argon, krypton and xenon, and said molecular gas being selected from the group consisting essentially of carbon dioxide and methane.

11. The combination defined in claim 8 in which said gas is a mixture including helium as one constituent thereof.

12. The combination defined in claim 8 in which said gas is a mixture including helium and argon as constituents thereof.

13. The combination defined in claim 8 in which said gas is a mixture including helium and krypton as constituents thereof.

14. The combination defined in claim 8 in which said gas is a mixture including helium and xenon as constituents thereof.

15. The combination defined in claim 8 in which the interior of said container is a cavity resonant at the frequency of operation of said device.

16. A negative differential resistance device comprising in combination at least a binary gas mixture, one of said gases exhibiting a constant and decreasing probability of collision as a function of increasing electron energy, the other exhibiting an increasing probability of collision as a function of increasing electron energy, whereby a voltage current characteristic, including a negative differential resistance region is generated, and means for imparting through said gas mixture a predetermined voltage gradient.

17. A negative differential resistance device comprising in combination at least a binary gas mixture having a maximum mean free path of .01 cm. and a pressure ratio of $$\frac{P_2}{P_1}\sqrt{\frac{M_1}{M_2}}$$

where $P_1$ is the probability of collision with an atom of absorbing gas, $P_2$ is the probability of collision with an atom of scattering gas, $M_1$ is the relative mass of an atom of absorbing gas and $M_2$ is the relative mass of an atom of scattering gas, one of said gases exhibiting a constant and decreasing probability of collision as a function of increasing electron energy, the other exhibiting an increasing probability of collision as a function of increasing electron energy, whereby a voltage current characteristic, including a negative differential resistance portion, is generated, and means for imparting through said gas mixture a nominal predetermined voltage gradient equal to $$2\mu\sqrt{P_1P_1/P_2P_2}\sqrt{m/M_1N_2\sigma_2}$$

where $\mu$ is the selected electron energy, $P_1$ is the pressure of absorbing gas, $p_2$ is the pressure of the scattering gas, $m$ is the electron mass, $N_2$ is the density of atoms of the scattering gas, $\sigma_2$ is the cross-section of the gas at the selected electron energy, for biasing said gas mixture to said negative differential resistance portion.

References Cited

UNITED STATES PATENTS

| | | | |
|---|---|---|---|
| 2,217,187 | 10/1940 | Smith | 313—228 X |
| 2,706,786 | 4/1955 | White | 331—97 |
| 2,924,733 | 2/1960 | Schirmer et al. | 313—226 |
| 3,021,472 | 2/1962 | Hermquist | 313—230 X |
| 3,134,949 | 5/1964 | Tiemann | 307—88.5 |

OTHER REFERENCES

Basic Processes of Gaseous Electronics by Leonard B. Loeb, University of California Press, Berkeley and Los Angeles, 1955, pp. 651, 686–689, 698, 699.

DAVID J. GALVIN, *Primary Examiner.*